United States Patent [19]

Freesh

[11] Patent Number: 4,645,521
[45] Date of Patent: Feb. 24, 1987

[54] PARTICULATE TRAP

[76] Inventor: Charles W. Freesh, 2618 E. Elm St., Phoenix, Ariz. 85016

[21] Appl. No.: 724,675

[22] Filed: Apr. 18, 1985

[51] Int. Cl.$^4$ ............................................. B01D 45/06
[52] U.S. Cl. ......................................... 55/309; 55/320;
55/338; 55/441; 55/DIG. 30; 60/311; 181/265;
181/231
[58] Field of Search ................. 55/309, 320, 331, 332,
55/336, 338, 434, 441, DIG. 30, DIG. 20;
60/311; 181/265, 258, 231

[56] References Cited

U.S. PATENT DOCUMENTS

| 4,046 | 5/1845 | Grimes | 55/DIG. 20 |
| 210,828 | 12/1878 | Wiser | 55/DIG. 20 |
| 1,288,729 | 12/1918 | Stamey | 55/336 |
| 2,732,913 | 1/1956 | Higgins | 55/DIG. 30 |

Primary Examiner—Bernard Nozick
Attorney, Agent, or Firm—Drummond & Nissle

[57] ABSTRACT

Apparatus for removing particulate from gases. The apparatus includes an inlet conduit, an outlet conduit, and a cylindrical gas processing chamber positioned between and interconnecting the inlet conduit and outlet conduit. The processing chamber is also connected to a particulate collection chamber by a channel. The gas processing chamber includes a cylindrical wall. A hollow cone-shaped deflector member is positioned in and spaced away from the walls of the processing chamber and is positioned between the inlet and outlet conduits. Gases entering the apparatus flow through the inlet conduit and contact the deflector member. The deflector member directs the major portion of gases from the inlet conduit radially outwardly toward the wall of the gas processing chamber. The gases deflected radially outwardly travel around the deflector member and along the wall of the processing chamber. The majority of the gases traveling near the wall of the processing chamber are drawn away from the wall and exit the processing chamber through the outlet conduit. A minor portion of the gases is diverted from the processing chamber through the channel into the particulate collection chamber.

13 Claims, 8 Drawing Figures

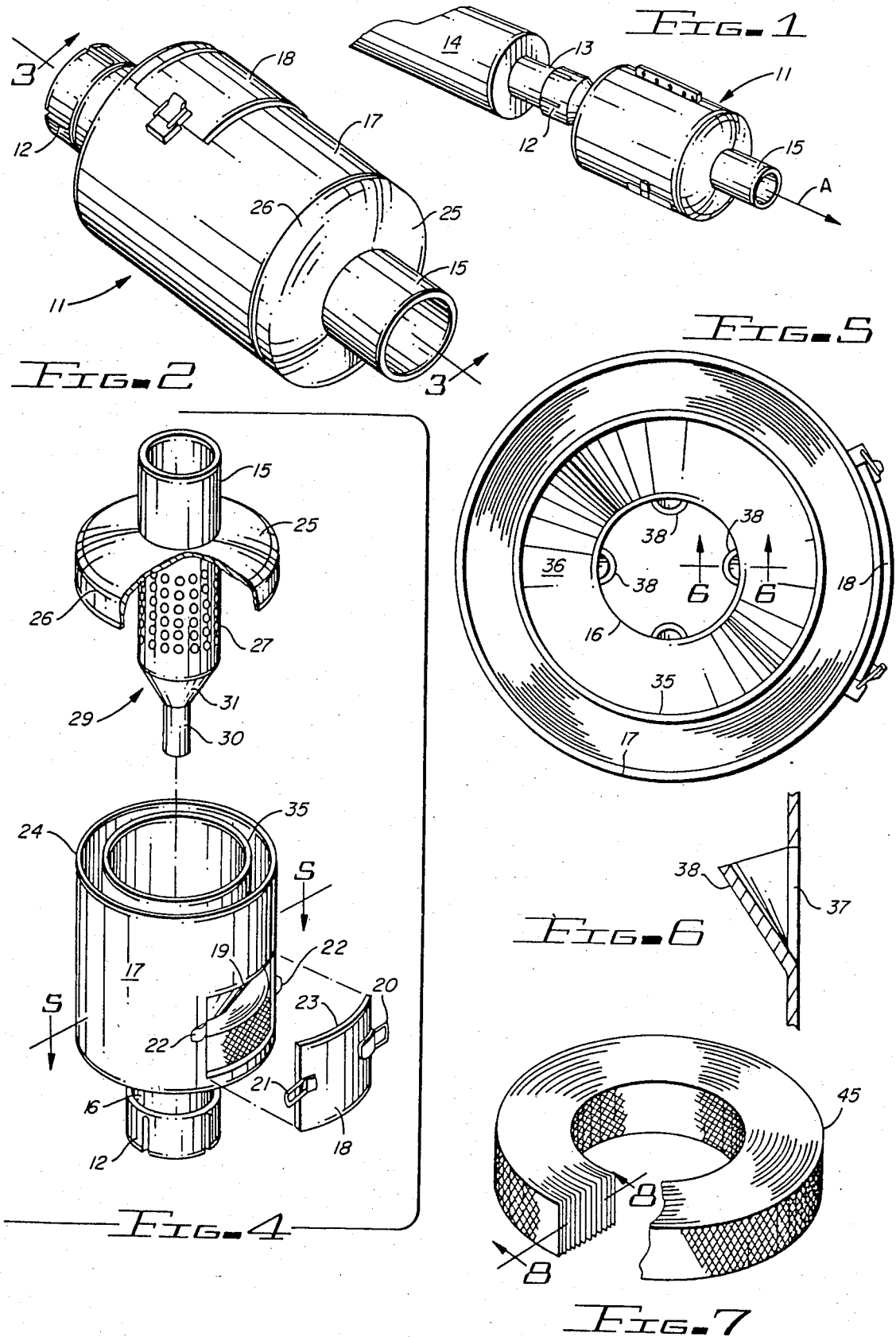

PARTICULATE TRAP

This invention relates to particulate traps.

More particularly, the invention relates to apparatus which removes particulate from the exhaust gas of an internal combustion engine.

In a further respect, the invention relates to a particulate trap which, to facilitate capturing of particulate by the trap, deflects a stream of particulate-laden exhaust gas entering the trap, the deflection of the gas stream causing particulate to be concentrated in part of the deflected stream.

In another respect, the invention relates to a particulate trap which, in order to facilitate removal of particulate by the trap from a stream of gas, utilizes a portion of an incoming particulate-laden stream of engine exhaust gas to assist in concentrating particulate in a discrete section of the stream of gas.

In still another respect, the invention relates to a particulate trap which can be inserted in the exhaust line of an internal combustion engine without increasing back pressure on the engine.

Apparatus for removing particulate from the exhaust gas of an internal combustion engine is well known in the art. However, an economical, readily installed and cleaned particulate trap apparently does not currently exist. As noted in the April 1983 issue of Popular Science:

"DIESEL-PARTICULATE TRAP

Build one that works, and the auto world will beat a path to your door. That seems to be the situation as GM tries to meet stricter regulations for reducing the amount of particulates (pieces of burned carbon) in diesel exhaust. The EPA wants the current 0.6-gram-per-mile standard cut to 0.2 gpm by 1985, and GM says it can't come up with a solution in time. Until now, GM has used traps made from foam, metal mesh, ceramic fiber, or honeycomb monoliths like catalytic converters to catch the exhaust particles. But these experimental types have to be cleaned out every 50 miles or they clog up the exhaust. You can burn the particles away with 1,100-degree-C. (2,012 F.) heat, but that takes a reburning system and produces extreme temperatures under the car. Got a better idea?"

Another drawback of existing particulate traps is that when they are installed in the exhaust line of an internal combustion engine they increase the back pressure on the engine.

Accordingly, it would be highly desirable to provide an improved particulate trap which was of relatively inexpensive manufacture and could be utilized on a vehicle for an extended period of time without having to be cleaned.

It would also be highly desirable to provide an improved particulate trap which could be installed in the exhaust line of an internal combustion engine without increasing the back pressure on the engine.

Therefore, it is the principal object of the invention to provide an improved apparatus for removing particulate from a stream of gas.

Another object of the invention is to provide improved particulate removal apparatus which is of simple construction, readily installed in the exhaust line of an engine, and is maintainable in position on the exhaust line of the engine for extended periods of time without having to be cleaned.

A further object of the invention is to provide an improved particulate trap which can be installed in the exhaust line of an internal combustion engine without increasing the back pressure on the engine.

Still another object of the instant invention is to provide an improved particulate trap which, to facilitate removal of particulate by the trap, deflects a stream of exhaust gas entering the trap, the deflection of the stream of gas causing particulate to be concentrated in a section of the stream of deflected gas.

Yet another object of the invention is to provide an improved particulate trap which, to facilitate capturing of particulate therein, utilizes a portion of a stream of engine exhaust gas entering the trap to assist in concentrating particulate in a discrete section of the incoming stream of gas.

These and other, further and more specific objects and advantages of the invention will be apparent to those skilled in the art from the following detailed description thereof, taken in conjunction with the drawings, in which:

FIG. 1 is a perspective view illustrating a particle trap constructed in accordance with the principles of the invention installed in the exhaust line of an engine;

FIG. 2 is an enlarged perspective view further illustrating the particulate trap of FIG. 1;

FIG. 4 is a perspective assembly view of the particulate trap of FIG. 2;

FIG. 5 is a top section view of the particle trap of FIG. 4 taken along section line 5—5 thereof;

FIG. 6 is a side section view of a portion of the particulate trap of FIG. 5 illustrating a gas vent formed therein;

FIG. 7 is a perspective view of a steel mesh doughnut which may be utilized in the trap of FIG. 2 to facilitate the capture of particulate therein; and, FIG. 8 is a section view of the mesh doughnut of FIG. 7 taken along section line 8—8 thereof.

Figure 3:
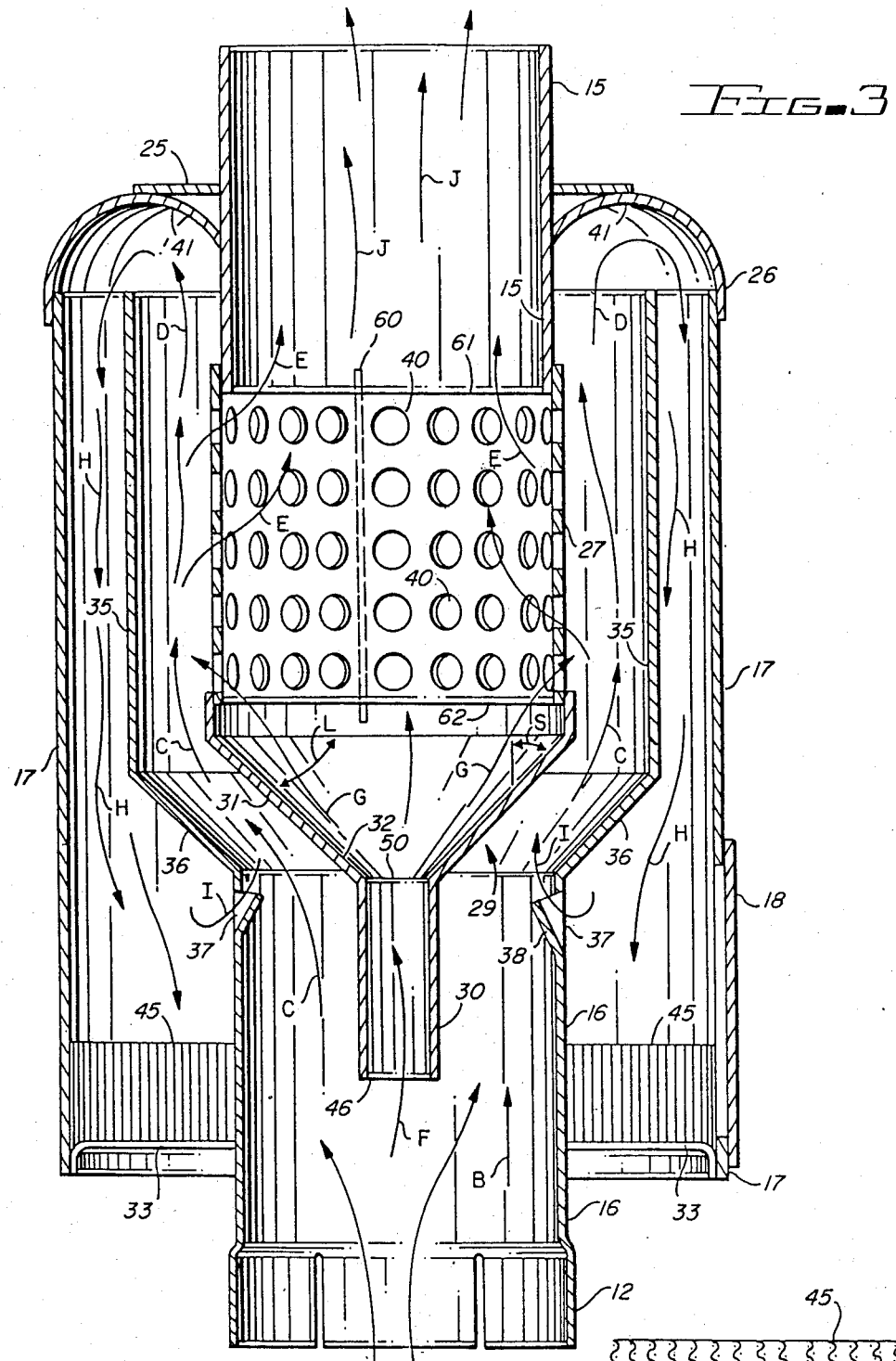
FIG. 3 is a section view of the particle trap of FIG. 2 taken along section line 3—3 thereof and further illustrating interior construction details thereof.
Figure 8:
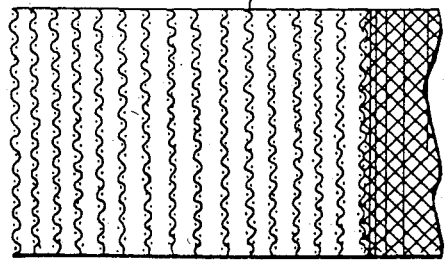

Briefly, in accordance with my invention, I provide an improved particulate trap. The trap includes an inlet conduit for receiving a stream of gas containing particulate, the gas moving through the conduit in a selected direction of travel; a processing chamber connected to the inlet conduit for receiving gas therefrom; an outlet conduit connected to the processing chamber for receiving gas passing from the inlet conduit into and through the chamber; a member carried in the particulate trap and having a surface positioned in the processing chamber at an angle with respect to the direction of travel of the gas moving through the inlet conduit, the surface generally deflecting gas from its direction of travel when the gas enters the chamber, the surface having an aperture formed therein which receives a minor effective portion of gas entering the chamber from the inlet conduit and which permits the minor effective portion of gas to pass therethrough without being deflected by the surface from the direction of travel of the gas; a particle collection chamber; and, channel means interconnecting the processing chamber and the collection chamber such that a portion of the gas deflected from the processing chamber surface and traveling through the processing chamber enters the channel means and flows into the collection chamber.

Turning now to the drawings in which the presently preferred embodiments of the invention are shown for the purpose of illustrating the practice thereof and not by way of limitation of the scope of the invention, and in which like reference characters represent corresponding elements throughout the several views, FIG. 1 illustrates a particulate trap generally indicated by reference character 11 and having cylindrical sleeve 12 sized to be press fit on conduit 13 leading from muffler 14. Exhaust gas from muffler 14 passes through conduit 13 and particulate trap 11 and exits trap 11 through outlet conduit 15 in the direction of travel indicated by arrow A. Trap 11 can be integrated in muffler 14 or into the exhaust gas line at any point therealong.

As shown in FIGS. 2-4, particulate trap 11 includes cylindrical housing 17 having door 18 with latches 20, 21 which, to position door 18 over aperture 19 formed in housing 17, engage clips 22 fixedly secured to housing 17. The peripheral part of the inner surface of door 18 is provided with a continuous strip of resilient material 23. When snaps 20, 21 are secured to clips 22, the strip of resilient material 23 is sealingly forced against the outer surface of housing 17 adjacent aperture 19 so that when door is installed on housing 17 as indicated in FIG. 2, aperture 19 is sealed and exhaust gas passing through particulate trap 11 cannot escape through aperture 19.

In FIG. 4 cap 25 carries outlet conduit 15 and apertured cylindrical chamber 27. Circular lip 26 of cap 25 fits over lip 24 of cylindrical housing 17. The lower end of apertured housing 27 is provided with hollow truncated cone 29 carrying outwardly projecting hollow cylindrical tube 30. Cone 29 includes outer surface 31 and inner surface 32.

A portion of the outer surface of inlet conduit 16 is attached to circular floor member 33. The peripheral circular edge of member 33 is sealingly connected to the lower portion of housing 17. The upper circular end of inlet conduit 16 is connected to a gas processing chamber which includes cylindrical wall 35 connected to truncated cone wall 36. Vent apertures 37 formed through the wall of cylindrical conduit 16 are provided with curved guards 38 attached to the interior surface of conduit 17. Guards 38 prevent gas flowing through conduit 16 in the direction of arrow B from entering apertures 37.

A channel including curved inner surface 41 interconnects the gas processing chamber with the particulate collection chamber of trap 11. The interior area of the particulate collection chamber is bounded on one side by walls 35, 36 of the processing chamber and the upper portion of the wall of inlet conduit 16 and on the other side by the wall of housing 17. Circular member 33 comprises the floor of the particulate collection chamber. Doughnut-shaped steel mesh collector 45 may be positioned in the collection chamber to improve the efficiency of the trap in removing particulate from incoming exhaust gas.

In use, after trap 11 is installed in the exhaust line of an engine in the manner shown in FIG. 1, engine exhaust gas from muffler 14 enters inlet conduit 16 in the direction of travel generally indicated by arrow B in FIG. 3. As the stream of exhaust gas travels into the collection chamber, the substantial portion of the stream contacts outer surface 31 of truncated cone 29 and is laterally deflected as indicated by arrow C. The deflection of exhaust gas laterally around outer surface 31 of cone 29 tends to increase the concentration of particulate in the portion of the gas stream near cylindrical wall 35 of the collection chamber such that gas entering the collection chamber as indicated by arrow D has a greater concentration of particulate than gas drawn inwardly through apertures 40 of member 27 in the direction indicated by arrows E.

A small portion of gas flowing into inlet conduit 16 does not contact surface 31 of cone 29 but instead travels into hollow conduit 30 as indicated by arrow F in FIG. 3. As indicated by arrows G, some of the gas traveling through conduit 30 moves over inner surface 32 of cone 29 and through apertures 40 near surface 32 to contact and partially deflect gas which is traveling through the collection chamber in the direction of arrows C. The lateral deflection by gas stream G of gas stream C is believed to facilitate the concentration of particulate in the portions of gas stream C adjacent wall 35 of the gas processing chamber. The travel of gas through conduit 30 and apertured cylindrical member 27 in the direction of arrow F tends to create a partial vacuum inside member 27 which assists in drawing gas into member 27 through apertures 40 in the direction of travel indicated by arrows E.

Exhaust gas traveling upwardly along wall 35 in the direction of arrows C, is, as shown by arrows D, directed into the particulate collection chamber. Gas entering the particulate collection chamber travels in the direction indicated by arrows H. Particulate collects in the collection chamber near or on floor 33. Steel mesh doughnut 45 attracts particulate and increases the efficiency of trap 11 in capturing particulate. Some of the exhaust gas entering the particle collection chamber recirculates through vent apertures 37 in the direction of travel indicated by arrows I. If the apparatus of the drawings is constructed without vents 37, then when the apparatus is installed in the exhaust line of an engine there may be an increase in engine back pressure. When vents 37 are formed in the wall of inlet conduit 16, there is usuallly no increase in engine back pressure when trap 11 is integrated in the exhaust line of an engine.

In FIG. 3, hollow cylindrical tube 30 extends past vent apertures 37 such that gas entering inlet conduit 16 reaches mouth 46 of tube 30 before it passes vent openings 37. This prevents exhaust gas flowing through vent apertures 37 in the direction of travel of arrows I from traveling into mouth 46 of conduit 30. Since the gas streams indicated by arrow I often have a higher concentration of particulate than gas which initially enters conduit 16 and flows into conduit 30, it is desirable to prevent the gas streams represented by arrows I from entering conduit 30 and to instead direct gas streams I back along walls 35, 36 of the gas processing chamber and, as indicated by arrow D, back into the particle collection chamber.

If tube 30 is removed from the apparatus of FIGS. 1-6, particulate trap 11 still reduces the amount of particulate in a stream of gas traveling through trap 11; however, trap 11 appears to function more efficiently when conduit 30 is attached to truncated cone 29 as illustrated.

Although housing 17, walls 35, 36 of the processing chamber; apertured member 27, cone 29, and conduits 15, 16, 30 are all cylindrically shaped in the presently preferred embodiment and best mode of the invention illustrated in the drawings, each of these components could, as would be appreciated by those of skill in the art, be square, hexagonal, or, in part or in whole, any other convenient or desired geometric shape.

Exhaust gas which travels in the direction of arrows C in FIG. 3 and does not move into the particulate collection chamber enters apertures 40 of member 27 and, along with gas flowing through conduit 30 and into the interior of chamber 27, exits trap 11 through conduit 15 in the direction of travel indicated by arrows J.

In the presently preferred embodiment of the invention, the inside diameter or "ID" of conduit 16 is approximately four inches and the cross-sectional area of conduit 16 is therefore approximately 12.57 square inches. The diameter of each aperture 40 is 0.375 inches and the area of each aperture 40 therefore 0.11045 square inches. The total area obtained by adding together the area of each aperture 40 formed in member 27 equals 22.2073 inches. The 22.2073 square inch area of apertures 40 represents the "flow through" area provided by member 27 for gas entering and passing through trap 11. The total 22.2073 square inch area of apertures 40 is about 176% of the cross-sectional area of conduit 16.

Providing a substantial "flow through" aperture area in cylindrical member 27 is important in preventing trap 11 from increasing the back pressure on an internal combustion engine when trap 11 is installed in an exhaust line leading from the engine. If the total area of apertures 40 is only 50% to 100% of the cross-sectional area of conduit 16, the back pressure on an engine will probably be increased when trap 11 is installed in an exhaust line leading from the engine. Increasing the number or size of apertures 40 such that the total area of all apertures is more than 176% of the cross-sectional area of conduit 16 may help to insure the back pressure on an engine will not be increased when trap 11 is installed in the exhaust line; however, after a certain point—for instance, if the total area of apertures 40 is more than 200% or 300% of the cross-sectional area of conduit 16—increasing the total area of apertures 40 in relation to the cross-sectional area of conduit 16 does not improve the ability of trap 11 to be inserted in an exhaust line without affecting engine back pressure.

If desired, member 27 can be removed from the apparatus of FIGS. 2–4 and two or more elongate rigid strips 60 used to secure cone 29 in the position shown in FIG. 3. One end of each structural strip 60 would be attached to outlet conduit 15 while the other end would, as illustrated by dashed lines 60 in FIG. 3, be attached to conduit 29.

If in FIG. 3 member 27 were eliminated and two or more elongate structural strips 60 utilized as described above, the space between lower circular edge 61 of conduit 15 and upper circular edge 62 of cone 29 would, except for strips 60, be open. If apertures 40 were not formed in member 27, the surface area of member 40 in the presently preferred embodiment of the invention would be equal to approximately 350% of the cross-sectional area of conduit 16. Thus, if member 27 is removed from trap 11 and a pair of elongate structural members 60 utilized to hang cone 29 from outlet conduit 15, the imaginary cylindrical "flow through" area between lower circular edge 61 of conduit 15 and upper circular edge 62 of cone 29 would be approximately 350% of the cross-sectional area of conduit 16. This large "flow through" area would permit the relatively unrestricted flow of gas in the direction of arrows C and E into exhaust conduit 15 and would insure that trap 11 would not increase the back pressure on an engine when installed in an exhaust line thereof. Member 27 can be removed and cone 29 secured in the position generally shown in FIG. 3 by any structural member or members as long as sufficient "flow through" area is, as earlier discussed, provided in the space between cone 29 and conduit 15 so gas freely flows therebetween in the direction of arrows E and into conduit 15.

Cone 29 can, in part or in whole, be replaced by a structural member or members having any desired geometric shape as long as the member or members has or have at least one surface positioned in the gas processing chamber. The surface can be flat or curved or both. The surface must generally be at some angle or angles S (FIG. 3) with respect to the direction of travel of gas entering the gas collection chamber. The surface must be oriented in the gas processing chamber such that gas entering the chamber and contacting the surface is deflected towards walls 35, 36. Portions of deflection surface 31 could be, as depicted in FIG. 3, positioned within inlet conduit 16.

In the presently preferred embodiment of the invention the approximate diameter of cylinder 35 is eight inches, of cylinder 27 four inches, and of cylinder 17 ten inches. Apertures 27 are three-quarters of an inch in diameter. Angle L (FIG. 3) is normally equal to 35° to 65°, 52° being preferred. The inside diameter of conduit 30 is one inch. The cross-sectional area of conduit 30 is preferably 1% to 25% of the cross-sectional area of inlet conduit 16.

The cylindrical walls of member 27 aid in guiding particulate-laden gas along wall 35 and into the particulate collection chamber of trap 11. When elongate members 60 are utilized in place of member 27, a larger proportion of gas having a high concentration of particulate tends to flow in the direction indicated by arrows E and into conduit 15.

Vent apertures 37 can also be formed in wall 35 and/or 36 of the gas processing chamber of particulate trap 11.

As noted earlier, inlet conduit 16, outlet conduit 15, member 27, conduit 30, the gas processing chamber including wall 35, and housing 17 all comprise, in the presently preferred embodiment of the invention, concentric hollow cylindrical members having a common imaginary longitudinal axis or centerline which is colinear with and lies along arrow A in FIG. 1. Each of these hollow concentric members generally is comprised of a single continuous cylindrical wall which circumscribes the longitudinal centerline and circumscribes the inner space of the cylindrical member. For example, cylindrical wall 35 of the gas processing chamber circumscribes the imaginary longitudinal axis and circumscribes the inner space through which gases travel in the manner indicated by arrows C and E in FIG. 3. The single continuous cylindrical wall of inlet conduit 16 circumscribes the imaginary longitudinal centerline of the cylindrical wall of conduit 16 and circumscribes the inner space of the conduit through which gases travel as indicated by arrows B, C, G and I in FIG. 3. The single continuous cylindrical wall of outlet conduit 15 circumscribes the imaginary longitudinal centerline of the cylindrical wall of conduit 15 and circumscribes the inner space of conduit 15 through which gases travel as indicated by arrows J in FIG. 3. The single perforated cylindrical wall of member 27 circumscribes the imaginary longitudinal centerline of the cylindrical wall of member 27 and circumscribes the inner space of member 27 into which gases travel as indicated by arrows E in FIG. 3. The cross-sectional areas of the various concentric hollow cylindrical components of the presently preferred embodiment of the invention are each represented by an imaginary plane which is perpendicular to the imaginary longitudinal centerline of the component and is bounded and circumscribed by the cylindrical wall of the component.

As would be appreciated by those of skill in the art, the imaginary longitudinal axis or centerline for the hollow cylindrical components of the particulate trap of the drawings is also the longitudinal centerline for hollow coneshaped member 39 and cone-shaped wall 36. An imaginary plane bounded and circumscribed by the wall of cone-shaped member 29 or wall 36 and perpendicular to the imaginary longitudinal centerline represents the cross-sectional area of member 29 or wall 36 at that particular point along the longitudinal axis. Wall 36 circumscribes an inner space through which gases flow in the manner indicated by arrows I and C in FIG. 3. Surface 32 of the wall of member 29 circumscribes and bounds an inner space through which gases flow in the manner indicated by arrows G in FIG. 3.

In FIG. 3, arrow F indicates the manner in which gases flow through the inner space circumscribed by the cylindrical wall of member 30.

If member 27 is removed from trap 11 and a pair of elongate structural members 60 utilized to hang cone 29 from outlet conduit 15, the imaginary cylindrical "flow through" area between lower circular edge 61 of conduit 15 and upper circular edge 62 is generally represented by an imaginary cylindrical plane having a position generally corresponding to the position of member 27 when member 27 is installed as shown in FIG. 3. The area of the imaginary cylindrical plane spanning the distance between lower circular edge 61 of conduit 15 and upper circular edge 62 would, in the presently preferred embodiment of the invention, be approximately 350% of the cross-sectional area of conduit 16. This large "flow through" area would permit the relatively unrestricted flow of gas in the direction of arrows C and E into exhaust conduit 15 and would insure that trap 11 would not increase the back pressure on an engine when installed in an exhaust line thereof.

Having described my invention in such terms as to enable those skilled in the art to which it pertains to understand and practice it, and having described the presently preferred embodiments thereof, I claim:

1. A particulate trap including
   (a) an inlet conduit for receiving a stream of gases containing particulate solids, said conduit having
      (i) a wall generally circumscribing an inner space, and imaginary longitudinal axis generally parallel to said wall, and
      (ii) a cross-sectional area generally represented by an imaginary plane perpendicular to said longitudinal axis and lying within said inner space circumscribed by said wall,
   said gases axially moving through said inner space of said conduit in a selected direction of travel generally parallel to said axis;
   (b) a gas processing chamber carried in said particulate trap in fluid communication with said inlet conduit for receiving gases therefrom, and gas processing chamber having
      (i) a wall generally circumscribing an inner space, and imaginary longitudinal axis generally parallel to said wall of said processing chamber, and
      (ii) a cross-sectional area generally represented by an imaginary plane perpendicular to said axis of said chamber and lying within said inner space circumscribed by said wall of said gas processing chamber,
   said cross-sectional area of said gas processing chamber being greater than said cross-sectional area of said inlet conduit;
   (c) a first hollow truncated cone-shaped member having a first end and a second end and interconnecting said inlet conduit and said gas processing chamber and
      (i) including a wall circumscribing an inner space of said member, and
      (ii) coverging from said first end to said second end,
   said second end being connected to said wall of said inlet conduit and said first end being connected said wall of said gas processing chamber;
   (d) an outlet conduit carried on said trap in fluid communication with said gas processing chamber to receive gases passing from said inlet conduit into and through said first cone-shaped member and said gas processing chamber, said outlet conduit having
      (i) a wall generally circumscribing an inner space, and imaginary longitudinal axis generally parallel to said wall, and
      (ii) a cross-sectional area generally represented by an imaginary plane perpendicular to said longitudinal axis of said outlet conduit and lying within said inner space circumscribed by said wall;
   (e) a second hollow truncated cone-shaped deflector member having a first end and a second end and carried in said particulate trap in said inner space circumscribed by said walls of said inlet conduit, said first cone-shaped member and said gas processing chamber, said second cone-shaped member
      (i) being
         spaced away from said walls of said inlet conduit, first cone-shaped member and gas processing chamber, and
         between said inlet and outlet conduits,
      (ii) deflecting gases and particulate outwardly away from said second coneshaped member and inlet conduit toward said walls of said gas processing chamber and first cone-shaped member,
      (iii) diverging from said first end to said second end, said first end being positioned between said inlet conduit and said second end, and
      (iv) including an aperture formed through said first end and sized to permit a minor effective portion of gases and particulate solids from said inlet conduit to flow generally in said selected direction of travel through said aperture and said second cone-shaped member toward said outlet conduit,
   said second cone-shaped member being shaped and dimensioned such that gases and particulate solids deflected therefrom must, after traveling outwardly toward said wall of said gas processing chamber and around said second cone-shaped member, generally travel away from said wall of said processing chamber and inwardly toward said longitudinal axis thereof to flow into said outlet conduit;
   said flow of gases and particulate solids through said aperture and said processing chamber in said selected direction of travel toward said outlet conduit tending to inwardly draw away from said wall of said processing chamber gases traveling through said chamber after being deflected by said second coneshaped member toward said wall of said processing chamber and around said second deflector member;
(f) a particulate collection chamber having an outlet for gas; and,
(g) channel means interconnecting said processing chamber and particulate collection chamber such that a portion of said gases and particulate solids generally moving in said selected direction of travel adjacent said wall of said processing chamber after being deflected toward said wall of said processing chamber by said second cone-shaped member enters said channel means and flows into said collection chamber and said portion of said gases exits through said outlet for gas.

2. The apparatus of claim 1 wherein said cross-sectional area of said outlet conduit is generally equivalent to said cross-sectional area of said inlet conduit.

3. The apparatus of claim 1 wherein said particulate collection chamber is adjacent said inlet conduit.

4. The apparatus of claim 1 including an auxiliary conduit member attached to and extending from said aperture formed in said second end of said second cone-shaped member and sized such that a minor effective portion of gases and particulate generally flows from said inlet conduit in said selected direction of travel into and through said auxiliary conduit member, through said second hollow cone-shaped member and through said gas processing chamber toward said outlet conduit, said auxiliary conduit member including a distal gas receiving end spaced away from said second cone-shaped member, said auxiliary conduit member having
(a) a wall generally circumscribing an
    inner space, and
    imaginary longitudinal axis generally parallel to said wall, and
(b) a cross-sectional area generally represented by an imaginary plane perpendicular to said longitudinal axis and lying within said inner space circumscribed by said wall of said auxiliary member.

5. The apparatus of claim 4 wherein said cross-sectional area of said auxiliary conduit member is 1 to 25% of said cross-sectional area of said inlet conduit.

6. The apparatus of claim 4 including a generally cylindrical panel member interconnecting said second end of said second cone-shaped member and said outlet conduit, said cylindrical panel member having perforations formed therethrough, the total of the cross-sectional areas of said perforations being greater than said cross-sectional area of said inlet conduit, said total cross-sectional area of said perforations representing the total available flow-through area available to gases moving through said performation.

7. The apparatus of claim 6 wherein said total of the cross-sectional areas of said perforations is greater than 176% of said cross-section area of said inlet conduit.

8. The apparatus of claim 4 wherein the total surface area of an imaginary generally cylindrical plane interconnecting said second end of said second cone-shaped member and said wall of said outlet conduit is greater than said cross-sectional area of said inlet conduit, said total surface area of said imaginary generally cylindrical plane representing the total available flow-through area available to gases moving away from said wall of said processing chamber to a position between said second cone-shaped member and said outlet conduit.

9. The apparatus of claim 8 wherein said total surface area of said imaginary cylindrical plane is greater than 176% of said cross-sectional area of said inlet conduit.

10. The apparatus of claim 4 including a return channel extending from said particulate collection chamber through said wall of said inlet conduit such that gases flowing through said channel means into said particulate collection chamber can flow through said return channel into said inlet conduit.

11. The apparatus of claim 10 wherein said return channel passes through said wall of said inlet conduit at a point intermediate said distal end of said auxiliary conduit member and said first cone-shaped member.

12. The apparatus of claim 1 including a return channel extending from said particulate collection chamber through said wall of said inlet conduit such that gases flowing through said channel means into said particulate collection chamber can flow through said return channel into said inlet conduit.

13. The apparatus of claim 12 wherein said cross-sectional area of said outlet conduit is generally equivalent to said cross-sectional area of said inlet conduit.

* * * * *